US010951889B2

(12) United States Patent
Ota et al.

(10) Patent No.: US 10,951,889 B2
(45) Date of Patent: Mar. 16, 2021

(54) IMAGE DELIVERY DEVICE, IMAGE DELIVERY PROGRAM, AND IMAGE DELIVERY METHOD

(71) Applicant: SONY INTERACTIVE ENTERTAINMENT INC., Tokyo (JP)

(72) Inventors: Osamu Ota, Tokyo (JP); Yasunari Hatasawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 733 days.

(21) Appl. No.: 15/036,481

(22) PCT Filed: Jul. 1, 2014

(86) PCT No.: PCT/JP2014/067522
§ 371 (c)(1),
(2) Date: May 13, 2016

(87) PCT Pub. No.: WO2015/075961
PCT Pub. Date: May 28, 2015

(65) Prior Publication Data
US 2016/0269731 A1 Sep. 15, 2016

(30) Foreign Application Priority Data

Nov. 25, 2013 (JP) .............................. JP2013-243323

(51) Int. Cl.
H04N 19/115 (2014.01)
H04N 19/196 (2014.01)
(Continued)

(52) U.S. Cl.
CPC ......... H04N 19/124 (2014.11); H04N 19/115 (2014.11); H04N 19/14 (2014.11);
(Continued)

(58) Field of Classification Search
CPC ......... H04L 29/06; G06T 5/00; H04N 19/124; H04N 19/115; H04N 19/14; H04N 19/176; H04N 19/30; H04N 21/234327
(Continued)

(56) References Cited

U.S. PATENT DOCUMENTS

2002/0065925 A1*  5/2002  Kenyon ................. H04L 29/06
                                                         709/231
2013/0235035 A1    9/2013  Nara et al.

FOREIGN PATENT DOCUMENTS

JP    2006-121578 A    5/2006
JP    2011-507345 A    3/2011
(Continued)

OTHER PUBLICATIONS

Tokuda, "Tokuda_JP_2006_121578A", Nov. 5, 2006.*
International Search Report dated Sep. 30, 2014, from the corresponding PCT/JP2014/067522.

Primary Examiner — Albert Kir
(74) Attorney, Agent, or Firm — Katten Muchin Rosenman LLP

(57) ABSTRACT

An image delivery device is, for example, implemented which is capable of better preventing delays even when real-timeness is required. The image delivery device includes operation information acquisition means, image information acquisition means, allocation information generation means, compression means, and transmission means. The operation information acquisition means acquires operation information. The image information acquisition means acquires image information generated on the basis of the operation information. The allocation information generation means generates allocation information representing allocation of numbers of bits during compression of the image information on the basis of the operation information. The compression means compresses the image information (Continued)

on the basis of the allocation information. The transmission means transmits the compressed image information.

8 Claims, 9 Drawing Sheets

(51) Int. Cl.
    *H04N 19/124*     (2014.01)
    *H04N 19/176*     (2014.01)
    *H04N 19/30*     (2014.01)
    *H04N 19/14*     (2014.01)
    *H04N 21/2343*     (2011.01)

(52) U.S. Cl.
    CPC ........... *H04N 19/176* (2014.11); *H04N 19/30* (2014.11); *H04N 21/234327* (2013.01)

(58) Field of Classification Search
    USPC ........... 345/419; 709/231; 375/240.02, 240.2
    See application file for complete search history.

(56) References Cited

FOREIGN PATENT DOCUMENTS

| | | |
|---|---|---|
| JP | 2012-129847 A | 7/2012 |
| WO | 2009/073823 A1 | 6/2009 |

* cited by examiner

F I G . 2
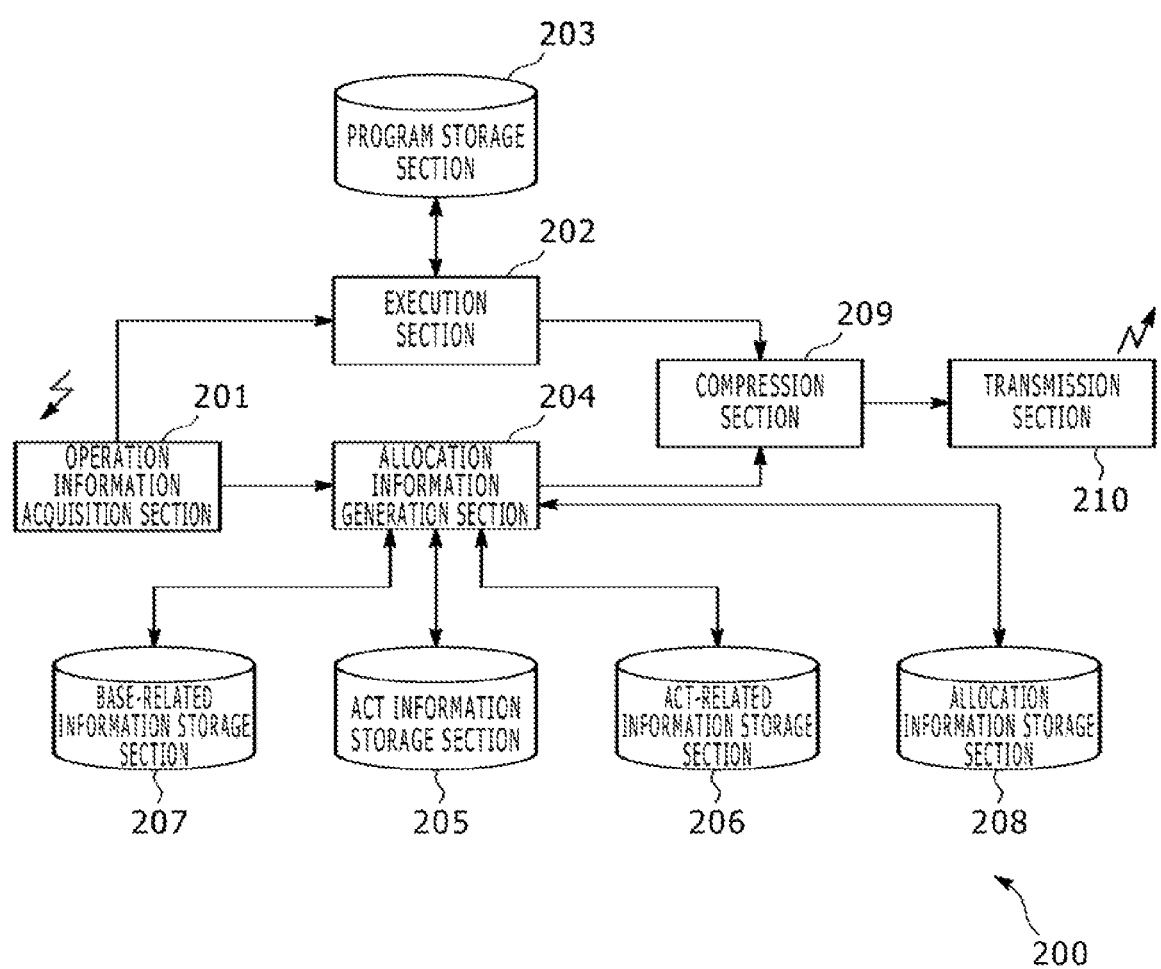

FIG.4

| Act Type (n-1) | Command (n) | Act Type (n) |
|---|---|---|
| None | Right | Direc_R_Start |
| None | Left | Direc_L_Start |
| None | Circle | Act_Start |
| Direc_R_Start | Right | Direc_R_Continue |
| Act_Start | Cross | Act_Continue |
| ... | ... | ... |

FIG.5

| Act Type (n) | Base Map (n) |
|---|---|
| Direc_R_Continue | Right |
| Act_Start | Center |
| Act_Continue | Center |
| | |

IMAGE DELIVERY DEVICE, IMAGE DELIVERY PROGRAM, AND IMAGE DELIVERY METHOD

TECHNICAL FIELD

The present invention relates to an image delivery device, an image delivery program, and an image delivery method.

BACKGROUND ART

Streamed cloud games are known. In the technology, a game program is executed on the cloud side, and image information generated as a result of execution of the game program is compressed and delivered to terminals by streaming.

Here, among known image information compression techniques are scalable video coding and HEVC. The former permits reduction of transfer size. However, this technique incurs a large delay during encoding and decoding, making this technique unfit for games that require real-timeness. The latter prepares streams with a plurality of resolutions in advance and switches between the streams before delivery, making it difficult to apply the technique to games that require real-timeness.

SUMMARY

Technical Problem

The present invention has been devised in light of the foregoing, and it is an object of the present invention to implement, for example, an image delivery device capable of better preventing delays even when real-timeness is required as in games.

Solution to Problem (1) An image delivery device according to the present invention includes operation information acquisition means, image information acquisition means, allocation information generation means, compression means, and transmission means. The operation information acquisition means acquires operation information. The image information acquisition means acquires image information generated on a basis of the operation information. The allocation information generation means generates allocation information representing allocation of numbers of bits during compression of the image information on the basis of the operation information. The compression means compresses the image information on a basis of the allocation information. The transmission means transmits the compressed image information.

(2) In the image delivery device described in (1) above, the allocation information generation means includes base information generation means. The base information generation means generates, on a basis of act information representing behavior of a target to be operated in accordance with the operation information, base information with which image quality information is associated. The image quality information represents image quality level of each of a plurality of blocks into which the image information is divided. The image quality level is proportional to a number of bits allocated to each of the blocks. The allocation information generation means generates the allocation information on a basis of the last allocation information and the base information.

(3) In the image delivery device described in (2) above, the allocation information generation means includes weighting means and addition means. The weighting means assigns a given weight to the last allocation information. The addition means adds the last allocation information with the assigned weight to the base information.

(4) The image delivery device described in (2) above, further includes base-related information storage means. The base-related information storage means stores base-related information that associates the act information and the base information. The base information generation means generates the base information on a basis of the act information and the base-related information.

(5) The image delivery device described in (4) above, still further includes act-related information storage means. The act-related information storage means stores act-related information that associates the last act information, the operation information, and the act information. The base information generation means includes act information acquisition means, act information determination means, and base information acquisition means. The act information acquisition means acquires the last act information. The act information determination means determines the act information on a basis of the acquired last act information, the operation information, and the act-related information. The base information acquisition means acquires the base information on a basis of the determined act information.

(6) In the image delivery device described in (2) above, the allocation information includes a first area, a second area, and a third area. A first number of bits is allocated to the first area. A number of bits, smaller than the number assigned to the first area in accordance with the image quality information, is allocated to the second area. A minimum number of bits is allocated to the third area.

(7) An image delivery system includes the image delivery device described in (1) above and a terminal adapted to decompress the compressed image information.

(8) An image delivery program according to the present invention is a program for causing a computer to function as operation information acquisition means, image information acquisition means, allocation information generation means, compression means, and transmission means. The operation information acquisition means acquires operation information. The image information acquisition means acquires image information generated on a basis of the operation information. The allocation information generation means generates allocation information representing allocation of numbers of bits during compression of the image information on the basis of the operation information. The compression means compresses the image information on a basis of the allocation information. The transmission means transmits the compressed image information.

(9) An image delivery method according to the present invention acquires operation information. The image delivery method further acquires image information generated on a basis of the operation information. The image delivery method still further generates allocation information representing allocation of numbers of bits during compression of the image information on the basis of the operation information. The image delivery method still further compresses the image information on a basis of the allocation information and transmits the compressed image information.

(10) In the image delivery device described in (1) above, the allocation information generation means generates the allocation information in parallel with generation of the image information.

BRIEF DESCRIPTION OF DRAWINGS

FIG. 2 is a diagram illustrating an example of a functional configuration of an image delivery device.

FIG. 4 is a diagram illustrating an example of act-related information.

FIG. 5 is a diagram illustrating an example of base-related information.

DESCRIPTION OF EMBODIMENT

Figure 1:
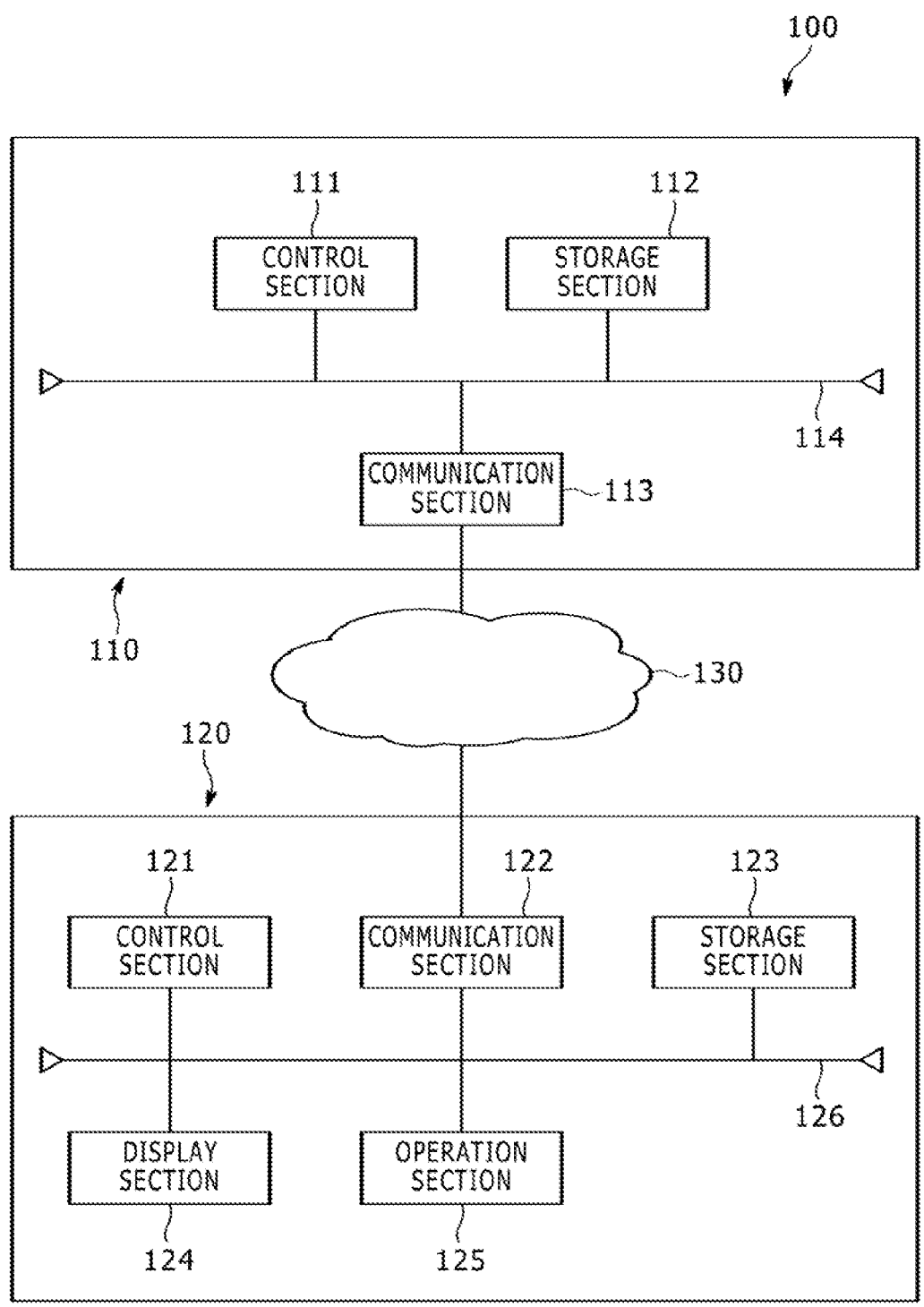
FIG. 1 is a diagram illustrating the outline of a hardware configuration of an image delivery system.

A description will be given below of a preferred embodiment of the present invention with reference to the accompanying drawings. It should be noted that the same or like components shown in the drawings will be denoted by the same reference numerals, and that the description thereof will be omitted as appropriate.

FIG. 1 is a diagram illustrating the outline of a hardware configuration of an image delivery system according to an embodiment of the present invention. As illustrated in FIG. 1, an image delivery system 100 includes a server 110 and a terminal 120 that are connected via a network 130 (e.g., Internet). It should be noted that although including the single terminal 120 in FIG. 1, the image delivery system 100 may include the plurality of terminals 120.

As illustrated in FIG. 1, the server 110 includes a control section 111, a storage section 112, and a communication section 113. Further, the control section 111, the storage section 112, and the communication section 113 are connected to one another via a bus 114. The control section 111 is, for example, a CPU which operates in accordance with a program stored in the storage section 112. The storage section 112 includes information storage media such as hard disk drive, ROM, and RAM, holding the program executed by the control section 111. Further, the storage section 112 serves as a work memory of the control section 111. The communication section 113 is, for example, a network interface, exchanging information via the network 130 in accordance with instructions from the control section 111.

The terminal 120 includes a control section 121, a communication section 122, a storage section 123, a display section 124, and an operation section 125. Similarly, each of the same sections 121 to 125 are connected to each other via a bus 126. As with the server 110 described above, the control section 121 is, for example, a CPU which operates in accordance with a program stored in the storage section 123. The communication section 122 is a network interface, exchanging information via the network 130 in accordance with instructions from the control section 121.

The storage section 123 includes information storage media such as hard disk, ROM, and RAM, holding the program executed by the control section 121. Further, the storage section 123 serves as a work memory of the control section 121. The display section 124 is, for example, a liquid crystal or organic EL display, showing information in accordance with instructions from the control section 121. The operation section 125 includes interfaces such as keyboard, mouse, controller, and buttons, outputting details of the instruction operation in response to a user's instruction operation.

It should be noted that programs processed by the control sections 111 and 121 may be supplied, for example, by downloading via a network. Alternatively, programs may be supplied by a variety of computer-readable information storage media such as CD-ROM and DVD-ROM. Besides, the above configurations of the server 110 and the terminal 120 are merely examples, and the present invention is not limited thereto. Further, the configuration of the image delivery system 100 is merely an example, and the present invention is not limited thereto. For example, the image delivery system 100 may be implemented by a so-called cloud technology.

FIG. 2 is a diagram illustrating an example of a functional configuration of an image delivery device. An image delivery device 200 is implemented, for example, by the server 110 described above. As illustrated in FIG. 2, the image delivery device 200 includes, for example, an operation information acquisition section 201, an execution section 202, a program storage section 203, an allocation information generation section 204, an act information storage section 205, an act-related information storage section 206, a base-related information storage section 207, an allocation information storage section 208, a compression section 209, and a transmission section 210.

The operation information acquisition section 201 successively acquires operation information. More specifically, for example, operation instruction information appropriate to user's operation instruction is transmitted to the image delivery device 200 and held in a buffer (not shown) of the image delivery device 200. Then, the operation information held in the buffer is successively acquired by the operation information acquisition section 201 at given times.

The execution section 202 executes the game program specified by the user, generating image information based on acquired operation information. For example, a plurality of game programs are stored in the program storage section 203. The execution section 202 acquires the user-specified game program from the program storage section 203, executing the program.

Figure 3:
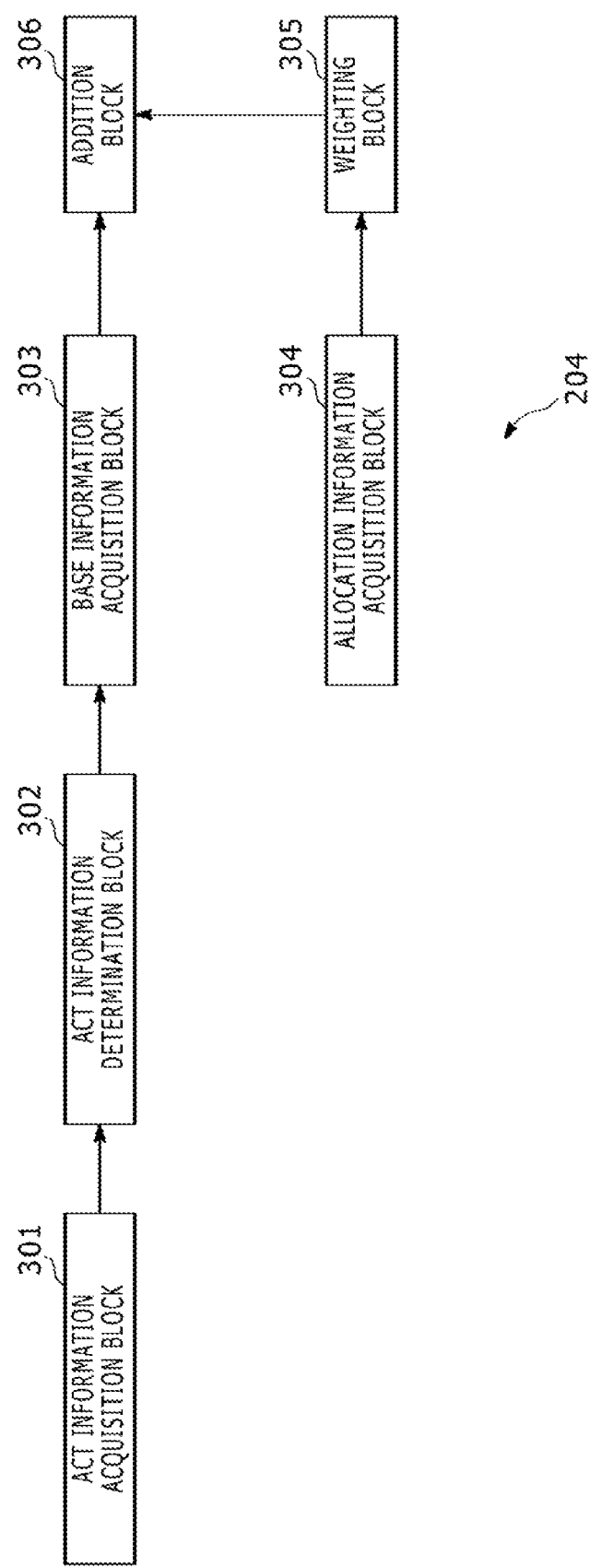
FIG. 3 is a diagram illustrating an example of a functional configuration of an allocation information generation section illustrated in FIG. 2.

The allocation information generation section 204 generates allocation information representing allocation of numbers of bits during compression of image information on the basis of the operation information acquired by the operation information acquisition section 201. More specifically, as illustrated in FIG. 3, the allocation information generation section 204 includes, for example, an act information acquisition block 301, an act information determination block 302, a base information acquisition block 303, an allocation information acquisition block 304, a weighting block 305, and an addition block 306.

The act information acquisition block 301 acquires frame-period-old act information (Act Type(n−1)) stored in the act information storage section 205. It should be noted that the act information storage section 205 and act information will be described in detail later.

The act information determination block 302 acquires act information (Act Type(n)) of the current frame from the act-related information storage section 206 (described later)

on the basis of operation information (Command(n)) acquired by the operation information acquisition section 201 and the frame-period-old act information (Act Type(n−1)), determining this act information as act information of the current frame.

Here, act information represents the behavior of a target to be operated in accordance with operation information such as behavior of starting a rightward movement or that of continuing with a rightward movement. Act information is set up in advance for each game program.

The act-related information storage section 206 stores act-related information that associates, for example, frame-period-old act information (Act Type(n−1) in the figure), acquired operation information (Command(n) in the figure), and act information (Act Type(n) in the figure) of the current frame as illustrated in FIG. 4.

For example, if the frame-period-old act information acquired by the act information acquisition block 301 is None, and the operation information acquired by the operation information acquisition section 201 indicates Right as illustrated in the second row of FIG. 4, the act information determination block 302 acquires the frame-period-old act information and Direc_R_Start stored in association therewith as act information of the current frame. It should be noted that None, the above act information, corresponds, for example, to a case in which there is no frame-period-old act information or in which act information of the current frame cannot be acquired even by referring to the act-related information storage section 206. On the other hand, Direc_R_Start corresponds to act information representing the start of a rightward movement. In the Command(n) column, Right and Left represent rightward and leftward operation information, respectively. It should be noted these are illustrative, and that the present embodiment is not limited thereto. On the other hand, we assume that FIG. 4 shows act information one frame period previous to the nth frame as Act Type(n−1), operation information of the nth frame as Command(n), and act information of the nth frame as Act type(n).

When act information of the current frame is determined by the act information determination block 302, the act information storage section 205 stores the act information (Act Type(n)).

The base information acquisition block 303 acquires base information (Base Map(n)) from the base-related information storage section 207 on the basis of the determined act information (Act Type(n)). The base-related information storage section 207 stores base-related information that associates, for example, act information (Act Type(n)) of the current frame with base information (Base Map(n)) of the current frame appropriate to the act information as illustrated in FIG. 5. More specifically, for example, when Direc_R_Start is determined as the act information, the base information acquisition block 303 acquires the base information identified as Right stored in association with Direc_R_Start as in the above example.

Figure 6:
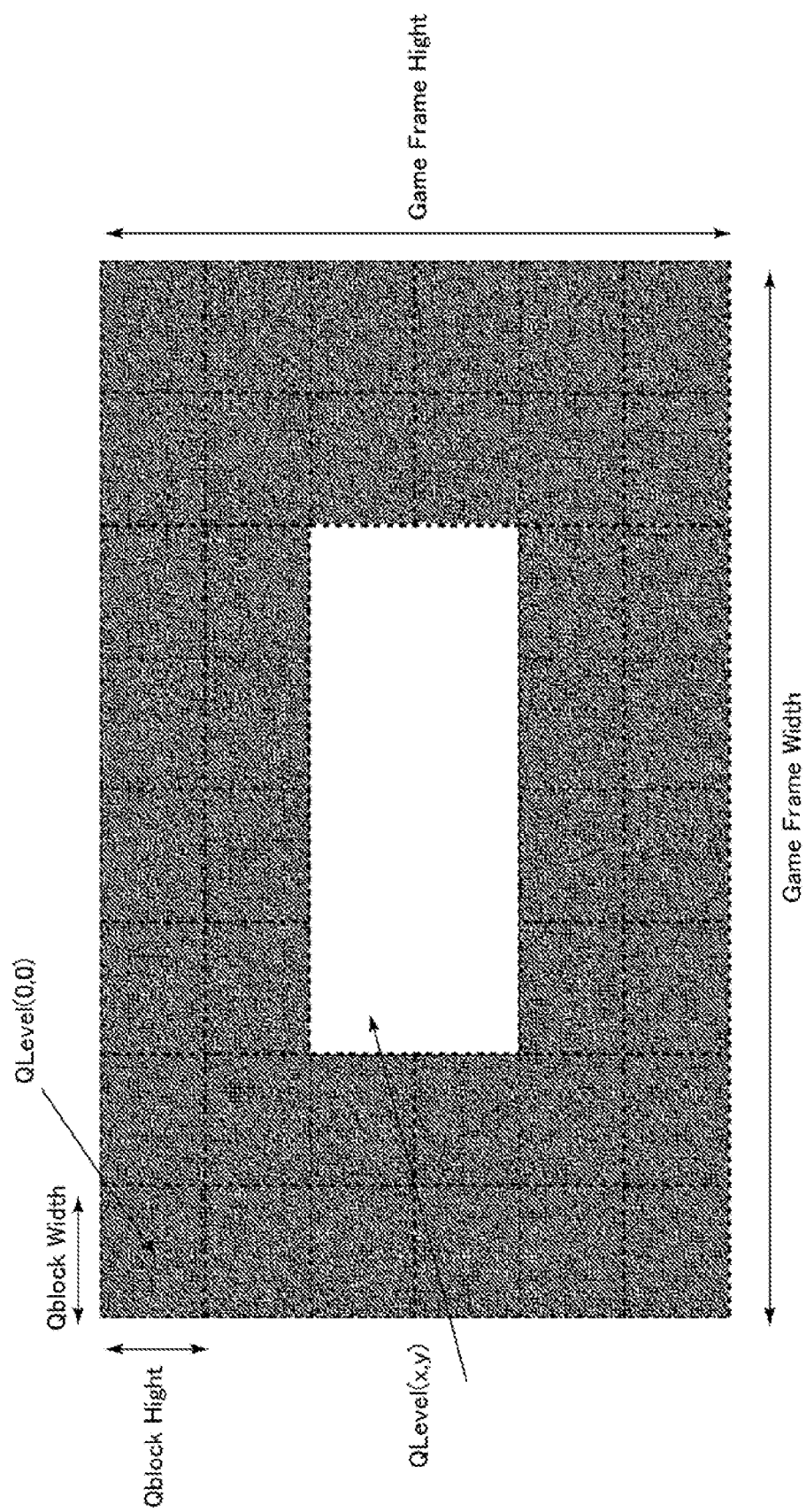
FIG. 6 is a diagram for describing base information.

A description will be given here of base information. FIG. 6 is a diagram for describing base information. As illustrated in FIG. 6, base information corresponds, for example, to a map in which image information generated by the execution section 202 is divided into blocks, each having a given size, and in which image quality information (QLevel(x,y)) representing the image quality level of each block is associated with that block. More specifically, FIG. 6 illustrates an example of base information when the image quality level of eight blocks in the center is increased. It should be noted that the base information illustrated in FIG. 6 is merely an example, and that the block size and count are not limited thereto. It should be noted that acquisition of base information is conducted, for example, for each program.

The allocation information generation section 204 generates allocation information (Q Map(n)) of the current frame on the basis of frame-period-old allocation information (Q Map(n−1)) and base information (Base Map(n)) acquired by the base information acquisition block 303. Allocation information (Q Map(n)) of the current frame is generated in parallel with generation of the current frame (image information of the nth frame).

Figure 7:
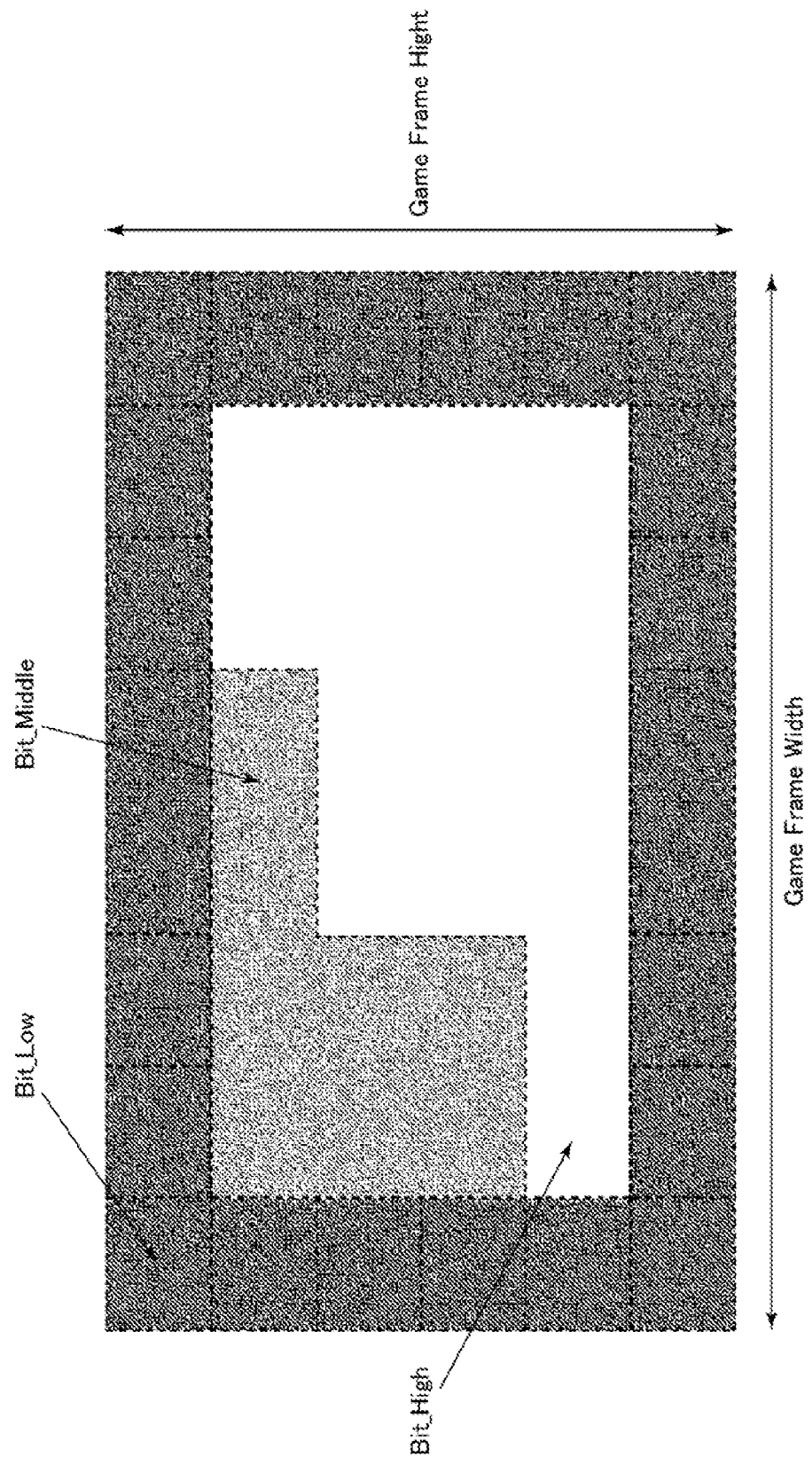
FIG. 7 is a diagram for describing allocation information.
Figure 8:
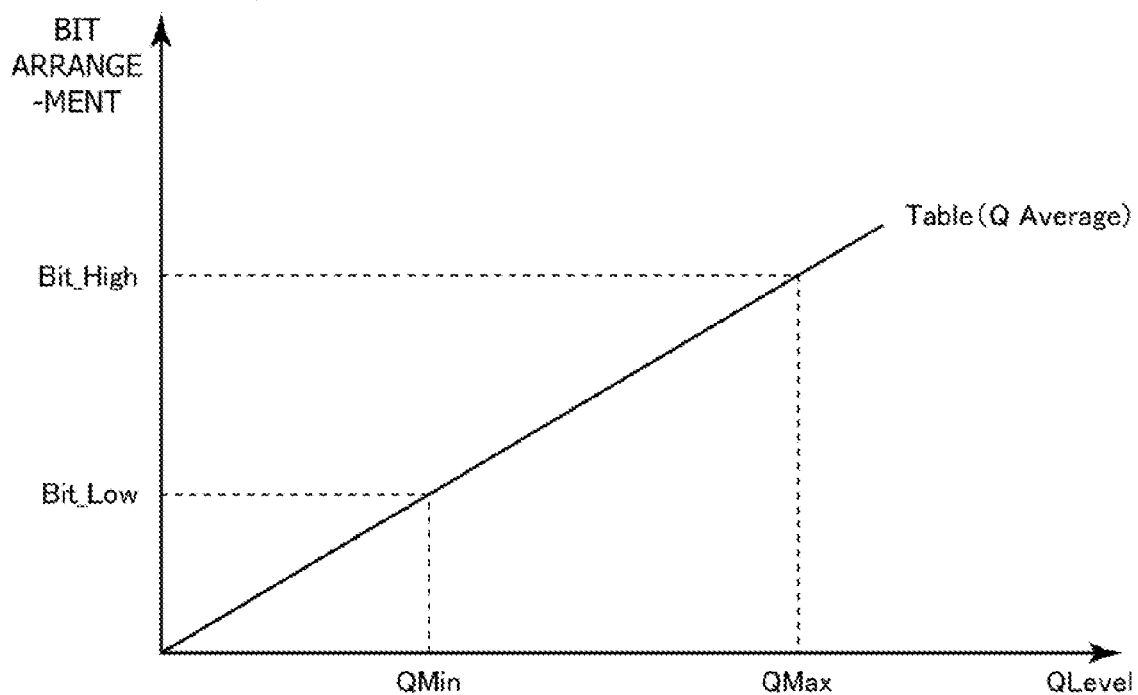
FIG. 8 is a diagram describing the relationship between image quality information and number of allocated bits.

A description will be given here of allocation information. FIG. 7 is a diagram for describing allocation information. As illustrated in FIG. 7, allocation information includes, for example, an area (Bit_High) to which many bits are allocated because of its high image quality level, another area (Bit_Middle area) to which less bits are allocated than for the Bit_High area in accordance with image quality information value (Q Level(x,y)), and still another area (Bit_Low area) to which a minimum number of bits is allocated. It should be noted that the relationship between image quality information and number of allocated bits is based, for example, on the average value (Q Average) of image quality information of allocation information as illustrated in FIG. 8. In this case, for example, when the image quality information is minimal, the number of bits is minimal. On the other hand, when the image quality information is maximal, the number of bits is maximal. Then, the number of allocated bits increases with increase in image quality information.

A description will be given next of a specific configuration example of the allocation information generation section 204. The allocation information generation section 204 includes, for example, an allocation information acquisition block 304, a weighting block 305, and an addition block 306.

The allocation information acquisition block 304 acquires frame-period-old allocation information (Q Map(n−1)) from the allocation information storage section 208. The weighting block 305 assigns a given weight to the frame-period-old allocation information (Q Map(n−1)). The addition block 306 adds the frame-period-old allocation information (Q Map(n−1)) with a weight assigned by the weighting block 305 to the base information acquired by the base information acquisition block 303, thus generating allocation information (Q Map(n)) of the current frame. The allocation information storage section 208 stores the allocation information (Q Map(n)) when the allocation information generation section 204 generates allocation information.

Figure 9:
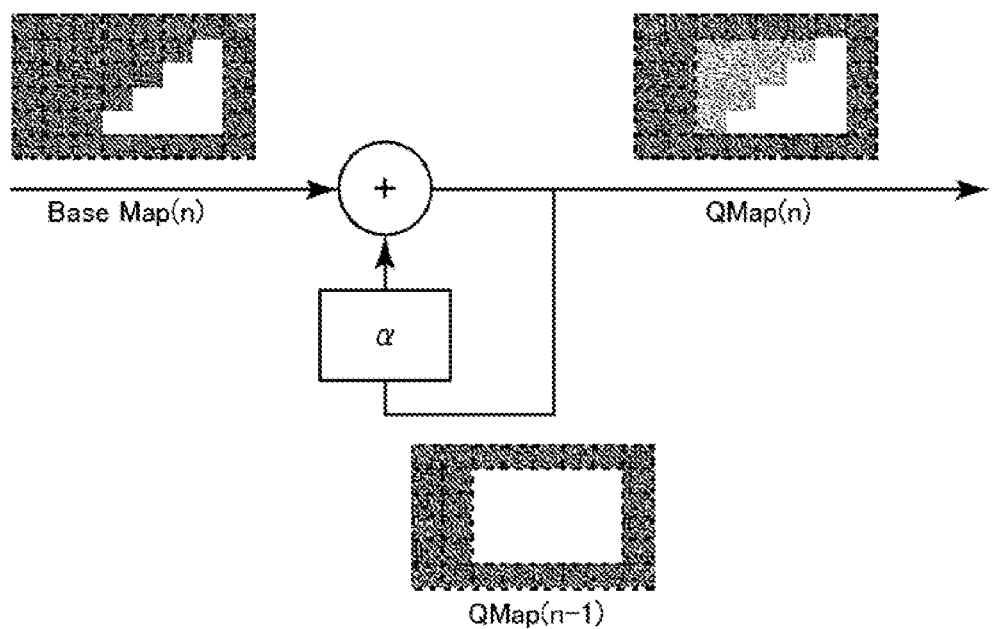
FIG. 9 is a diagram for schematically describing generation of allocation information.

FIG. 9 is a diagram for schematically describing generation of allocation information. As illustrated in FIG. 9, for example, frame-period-old allocation information (Q Map (n−1) (Center)) weights base information (Right) with α and is added to base information, thus generating allocation information (Q Map(n)) of the current frame. In this manner, the allocation information generation section 204 generates allocation information of the current frame. More specifically, as illustrated in FIG. 9, for example, allocation information (Q Map(n)) of the current frame that includes the Bit_High area, the Bit_Middle area, and the Bit_Low area is generated from base information (Base Map(n)) and frame-period-old allocation information (Q Map(n−1)). In base information (Base Map(n)), many bits are allocated to the center and bottom right of a frame image (image information). In frame-period-old allocation information (Q Map (n−1)), many bits are allocated to the approximate center of the frame image (image information). The Bit_High area, the Bit_Middle area, and the Bit_Low area, and so on are as described above. This allows for generation of current allocation information based on current operation information and frame-period-old allocation information.

The compression section 209 compresses (encodes) image information, generated by the execution section 202, on the basis of allocation information generated as described above. It should be noted the numbers of allocated bits during the compression are as described above. The transmission section 210 transmits compressed image information to the terminal 120. The terminal 120 decompresses (decodes) the image information, showing the image information on its display section 124. It should be noted that the base-related information, act-related information, base information, and act information, for example, are set for each program. This allows for generation of allocation information tailored to the features of each program because the server 110 knows which program will be executed.

Figure 10:
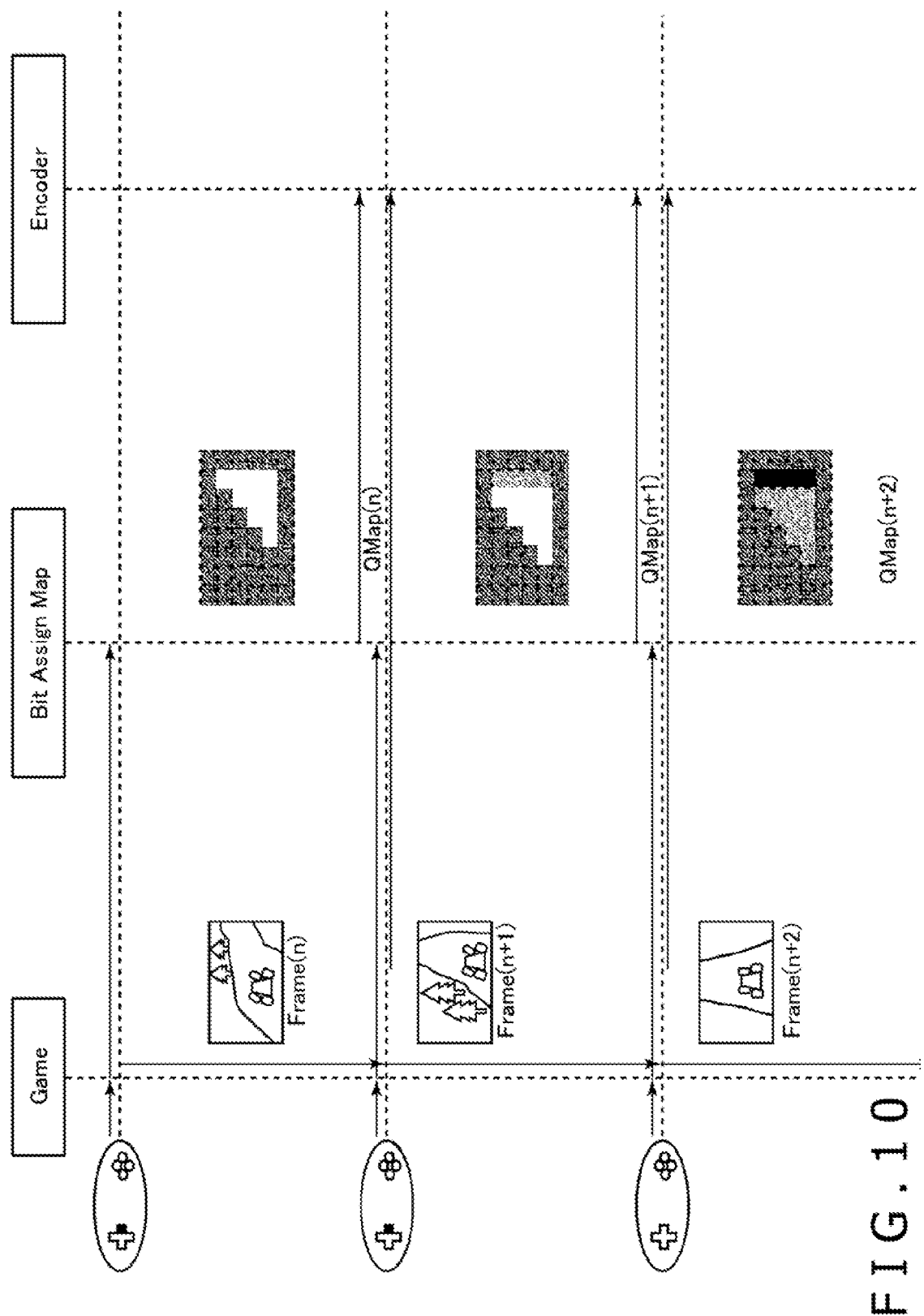
FIG. 10 is a diagram for describing the relationship in time between generation of image information, generation of allocation information, and compression.

A description will be given next of the relationship in time between generation of image information (frame image), generation of allocation information, and compression with reference to FIG. 10. As illustrated in FIG. 10, image information of the nth frame is generated in parallel with generation of allocation information (Q Map(n)) of the nth frame during the nth frame period. Then, immediately after generation of a frame image (Frame(n)), the compression section 209 compresses the frame image using the generated allocation information (Q Map(n)).

More specifically, for example, FIG. 10 is a diagram for describing the relationship in time between generation of a frame image, generation of allocation information, and compression when operation information representing a movement direction is not entered following entry of operation information representing rightward movement twice in a row in a car racing game. In this case, for example, allocation information (allocation information that allocates many bits to the bottom right of the frame image) (Q Map(n)) illustrated at the top of the figure is generated in accordance with operation information representing rightward movement during the first frame period. The frame image (Frame(n)) is compressed using the generated allocation information (Q Map(n)) and transmitted. During the next frame period following generation of the allocation information, operation information representing rightward movement is entered in a row. During the next frame period, therefore, allocation information (Q Map(n+1)) illustrated in the middle of the figure is generated which shows a smaller ratio of bits allocated to the bottom right than the above allocation information. A frame image (Frame(n+1)) is compressed using the generated allocation information (Q Map (n+1)) and transmitted. Then, during the frame period following the next, no operation information representing a movement direction is entered. Therefore, allocation information (Q Map(n+2)) illustrated at the bottom of the figure is generated which shows reduced numbers of assigned bits as a whole. A frame image (Frame(n+2)) is compressed using the generated allocation information (Q Map(n+2)) and transmitted. It should be noted that each frame image is generated in parallel with generation of allocation information in the above process as described above.

Figure 11:
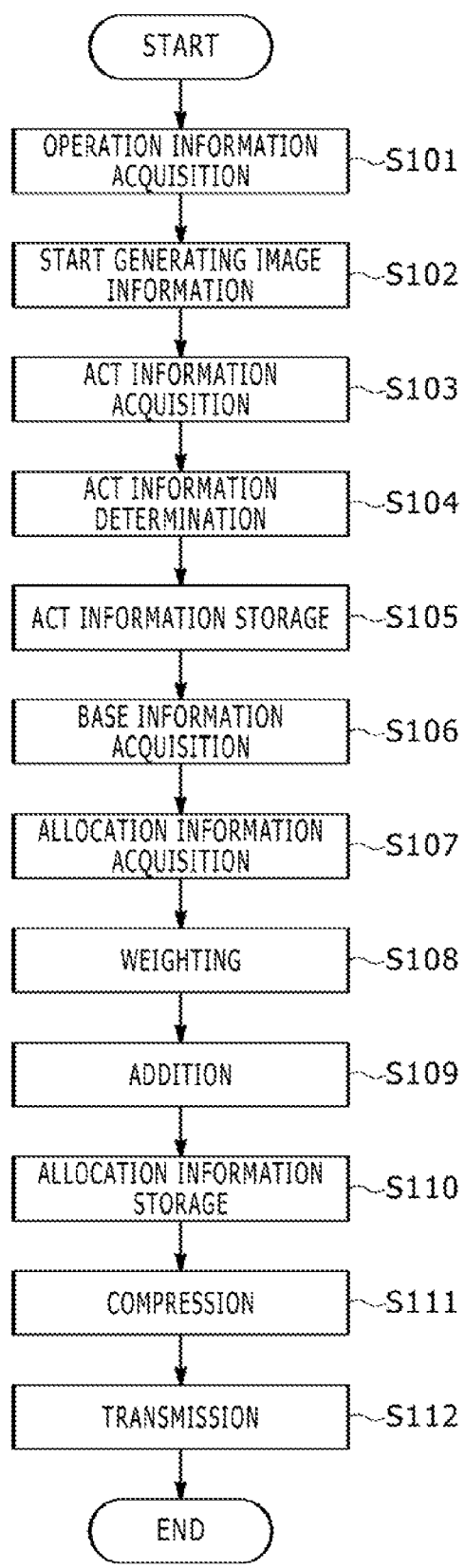
FIG. 11 is a diagram for describing the outline of the flow of processing steps performed by the image delivery device.

FIG. 11 is a diagram for describing the outline of the flow of processing steps performed by the image delivery device. More specifically, FIG. 11 illustrates an example of a flow of processing steps including generation and compression of image information up to transmission thereof to the terminal 120 during a frame period. It should be noted that although FIG. 11 illustrates steps for generation of only a single piece of image information and so on for simplified description, it is a matter of course that the flow shown in FIG. 11 is repeated to successively perform generation of image information and other steps.

The operation information acquisition section 201 acquires operation information (Command(n)) (S101). The execution section 202 executes the game program specified by the user, initiating the generation of image information based on acquired operation information (S102).

The act information acquisition block 301 acquires frame-period-old act information (Act Type(n−1)) from the act information storage section 205 (S103). The act information determination block 302 acquires act information (Act Type (n)) of the current frame from the act-related information storage section 206 on the basis of operation information acquired by the operation information acquisition section 201 and the frame-period-old act information (Act Type(n−1)), determining the act information (Act Type(n)) as act information of the current frame (S104). When act information (Act Type(n)) of the current frame is determined by the act information determination block 302, the act information storage section 205 stores the act information (Act Type(n)) (S105).

The base information acquisition block 303 acquires base information (Base Map(n)) from the base-related information storage section 207 on the basis of the determined act information (Act Type(n)) (S106). The allocation information acquisition block 304 acquires frame-period-old allocation information (Q Map(n−1)) from the allocation information storage section 208 (S107). The weighting block 305 assigns a given weight to the frame-period-old allocation information (Q Map(n−1)) (S108). The addition block 306 adds the frame-period-old allocation information (Q Map (n−1)) with a weight assigned by the weighting block 305 to the base information acquired by the base information acquisition block 303, thus generating allocation information (Q Map(n)) of the current frame (S109). The allocation information storage section 208 stores the allocation information (Q Map(n)) when the allocation information generation section 204 generates allocation information (S110). It should be noted that the steps from S103 to S110 are performed in parallel with generation of image information that begins in S102 as described above.

When image information is generated by the execution section 202, the compression section 209 compresses (encodes) the image information on the basis of the allocation information (Q Map(n)) generated as described above (S111). The transmission section 210 transmits compressed image information to the terminal 120 (S112), thus terminating the processing. It should be noted that the above flow is merely an example, and that the flow of processing steps performed by the image delivery device 200 is not limited to the above.

The present embodiment allows to implement, for example, an image delivery device capable of preventing delays during such tasks as compression of a frame image even when real-timeness is required as in game programs. Further, allocating many bits to an area of user's interest (e.g., area drawing user attention) contributes to enhanced subjective image quality for the user without changing the transfer size of the compressed image. Besides, allocating bits to the area of interest in the same manner as when the present embodiment is not used contributes to a reduced transfer size of the compressed image without degrading subjective image quality. Further, a common encoding scheme can be used for compression, and the compressed image can be decompressed (decoded) with common terminals.

The present invention is not limited to the above embodiment and can be modified in various ways. For example, the configuration shown in the above embodiment may be replaced with a substantially identical configuration, a configuration that provides the same effects, or a configuration that allows to achieve the same object. In the above embodiment, for example, game programs were primarily used as examples. However, the present invention is applicable to other application programs. Further, in the above embodiment, a case was described in which, for example, allocation information of the current frame is generated on the basis of frame-period-old allocation information and act information, followed by determination of act information. However, allocation information and so on may be generated based not only on frame-period-old allocation information but also on, for example, allocation information of the last frame, i.e., allocation information of a frame earlier than the current frame. Still further, in the above embodiment, a case was described as an example in which operation information is acquired, an image drawn, and image information encoded (compressed) every frame period. However, operation information may be acquired, an image drawn, and image information encoded at different intervals of frame periods. In other words, acquisition of operation information, drawing of an image, and encoding of image information may be conducted with different frame rates. Alternatively, base information may be generated to match each program. Further, base information may be generated to match scenes of the program. It should be noted that the base information generation means defined in the claims includes, for example, the act information acquisition block 301, the act information determination block 302, and the base information acquisition block 303 in the above embodiment.

The invention claimed is:

1. An image delivery device comprising:
   an operation information acquisition section operable to acquire operation information;
   an image information acquisition section operable to acquire image information generated on a basis of the operation information;
   an allocation information generation section operable to generate allocation information representing allocation of numbers of bits during compression of the image information on the basis of the operation information;
   a compression section operable to compress the image information on a basis of the allocation information; and
   a transmission section operable to transmit the compressed image information,
   wherein the allocation information generation section includes a base information generation portion adapted to generate, on a basis of act information representing behavior of a target to be operated in accordance with the operation information, base information with which image quality information is associated, the image quality information representing image quality level of each of a plurality of blocks into which the image information is divided, the image quality level being proportional to a number of bits allocated to each of the blocks, and
   the allocation information generation section generates the allocation information on a basis of the last allocation information and the base information,
   wherein the allocation information generation section includes:
   a weighting block adapted to assign a predetermined weight to the last allocation information; and
   an addition block adapted to add the last allocation information with the predetermined weight to the base information.

2. The image delivery device of claim 1, further comprising:
   a base-related information storage section operable to store base-related information that associates the act information and the base information,
   wherein the base information generation portion generates the base information on a basis of the act information and the base-related information.

3. The image delivery device of claim 2, still further comprising
   an act-related information storage section operable to store act-related information that associates the last act information, the operation information, and the act information,
   wherein the base information generation portion includes:
   an act information acquisition block adapted to acquire the last act information;
   an act information determination block adapted to determine the act information on a basis of the acquired last act information, the operation information, and the act-related information; and
   a base information acquisition block adapted to acquire the base information on a basis of the determined act information.

4. The image delivery device of claim 1,
   wherein the allocation information includes: a first area to which a first number of bits is allocated; a second area to which a number of bits, smaller than the number assigned to the first area in accordance with the image quality information, is allocated; and a third area to which a minimum number of bits is allocated.

5. An image delivery system comprising:
   an image delivery device including:
   an operation information acquisition section operable to acquire operation information,
   an image information acquisition section operable to acquire image information generated on a basis of the operation information,
   an allocation information generation section operable to generate first allocation information representing allocation of numbers of bits during compression of the image information on the basis of the operation information,
   a weighting section adapted to assign a predetermined weight to a last allocation information; and
   an addition section adapted to form transmission allocation information by adding the last allocation information with the predetermined weight to the first allocation information,
   a compression section operable to compress the image information using the transmission allocation information, and
   a transmission section operable to transmit the compressed image information; and
   a terminal operable to decompress the compressed image information.

6. An non-transitory computer readable medium having stored thereon an image delivery program for a computer, the image delivery program comprising:
   by an operation information acquisition section, acquiring operation information;

by an image information acquisition section, acquiring image information generated on a basis of the operation information;

by an allocation information generation section, generating first allocation information representing allocation of numbers of bits during compression of the image information on the basis of the operation information;

by a weighting section, assigning a predetermined weight to a last allocation information; and by an addition section, adding the last allocation information with the predetermined weight to the first allocation information to form transmission allocation information;

by a compression section, compressing the image information using the transmission allocation information; and by a transmission section, transmitting the compressed image information.

7. An image delivery method comprising:

acquiring operation information;

acquiring image information generated on a basis of the operation information;

generating first allocation information representing allocation of numbers of bits during compression of the image information on the basis of the operation information;

assigning a predetermined weight to a last allocation information;

adding the last allocation information with the predetermined weight to the first allocation information to form transmission allocation information compressing the image information using the transmission allocation information; and transmitting the compressed image information.

8. The image delivery device of claim 1, wherein the allocation information generation section generates the allocation information in parallel with generation of the image information.

* * * * *